US009926088B2

(12) United States Patent
Auer et al.

(10) Patent No.: US 9,926,088 B2
(45) Date of Patent: Mar. 27, 2018

(54) FILLING VALVE FOR LIQUIDS

(71) Applicant: ELOPAK SYSTEMS AG, Glattbrugg (CH)

(72) Inventors: Dirk Auer, Meerbusch (DE); Peter Barth, Aachen (DE); Thomas Hartmann, Korschenbroich (DE); Franz-Willi Spelten, Wegberg (DE)

(73) Assignee: ELOPAK AS, Spikkestad (NO)

( * ) Notice: Subject to any disclaimer, the term of this patent is extended or adjusted under 35 U.S.C. 154(b) by 44 days.

(21) Appl. No.: 15/037,897

(22) PCT Filed: Oct. 9, 2014

(86) PCT No.: PCT/EP2014/071634
§ 371 (c)(1),
(2) Date: May 19, 2016

(87) PCT Pub. No.: WO2015/074803
PCT Pub. Date: May 28, 2015

(65) Prior Publication Data
US 2016/0288933 A1 Oct. 6, 2016

(30) Foreign Application Priority Data

Nov. 19, 2013 (DE) .................. 10 2013 112 770

(51) Int. Cl.
*B65B 3/22* (2006.01)
*B67C 3/28* (2006.01)
(Continued)

(52) U.S. Cl.
CPC .............. *B65B 3/22* (2013.01); *B65B 39/001* (2013.01); *B67C 3/28* (2013.01); *F16K 11/04* (2013.01);
(Continued)

(58) Field of Classification Search
CPC ....... Y10T 137/8013; Y10T 137/87708; Y10T 137/87716; B65B 3/22; B65B 39/001;
(Continued)

(56) References Cited

U.S. PATENT DOCUMENTS 4,512,379 A 4/1985 Hennig
4,574,853 A 3/1986 Graffin
(Continued)

FOREIGN PATENT DOCUMENTS

CN 201137717 Y 10/2008
CN 102791612 A 11/2012
(Continued)

OTHER PUBLICATIONS

English translation of International Preliminary Report on Patentability, dated Jun. 2, 2016, 2 pgs.
(Continued)

*Primary Examiner* — Michael R Reid
(74) *Attorney, Agent, or Firm* — Lucas & Mercanti, LLP

(57) ABSTRACT

A filling valve for liquids, includes a liquid feed into a valve chamber, a valve seat, a closure element, which interacts with the valve seat and moves between an open position and a closed position, an outlet for the liquid, and a cylindrical discharge element arranged at the outlet with a plurality of passages. The surface of the discharge element facing the closure element forms a part of the valve seat. To avoid clogging of the passages in the discharge element by fibers in the liquid, the passages ending at the surface of the discharge element are extended from the surface toward the closure element by tubes. Each tube can be closed by a cap which surrounds the tube at least in the closed position forming an annular space.

15 Claims, 7 Drawing Sheets

(51) Int. Cl.
*F16K 11/04* (2006.01)
*B65B 39/00* (2006.01)
*B67C 3/26* (2006.01)

(52) U.S. Cl.
CPC . *B65B 2039/009* (2013.01); *B67C 2003/2671* (2013.01)

(58) Field of Classification Search
CPC ..... B65B 2039/009; F16K 11/04; B67C 3/28; B67C 2003/2671
USPC ..... 137/862, 863, 546; 141/301, 311 A, 392
See application file for complete search history.

(56) References Cited

U.S. PATENT DOCUMENTS

| | | | | |
|---|---|---|---|---|
| 4,768,558 A | * | 9/1988 | Weber | F16K 1/54 137/862 |
| 5,066,216 A | * | 11/1991 | Kowtko | A45D 40/16 137/862 |
| 5,865,221 A | | 2/1999 | Ludwig | |
| 8,931,526 B2 | | 1/2015 | Clüsserath | |
| 2012/0291898 A1 | | 11/2012 | Auer | |

FOREIGN PATENT DOCUMENTS

| | | |
|---|---|---|
| DE | 31 34 182 A1 | 3/1983 |
| DE | 10 2010 006 005 A1 | 7/2011 |
| EP | 00 99 582 A2 | 2/1984 |
| EP | 0 278 560 A1 | 8/1988 |
| EP | 0 754 144 A1 | 1/1997 |
| FR | 1601262 A | 8/1970 |
| WO | 97/015493 A1 | 5/1997 |
| WO | 2010/097730 A1 | 9/2010 |
| WO | 2011/049505 A1 | 4/2011 |
| WO | 2011/060853 A2 | 5/2011 |

OTHER PUBLICATIONS

English translation of Written Opinion, dated Apr. 4, 2016, 5 pgs.

* cited by examiner

FILLING VALVE FOR LIQUIDS

CROSS-REFERENCE TO RELATED APPLICATIONS

This application is a 371 of PCT/EP2014/071634 filed Oct. 9, 2014, which in turn claims the priority of DE 102013112770.3 filed Nov. 19, 2013, the priority of both applications is hereby claimed and both applications are incorporated herein by reference.

BACKGROUND OF THE INVENTION

The invention pertains to a filling valve for liquids comprising a liquid feed connected to a valve chamber, a valve seat, at least one closure element interacting with the valve seat, an outlet for the liquid, a cylindrical discharge element arranged at the outlet, which discharge element comprises a plurality of passages arranged next to each other and extending in an axial direction, wherein the surface of the discharge element facing the closure element forms a component of the valve seat.

Filling valves of this type are used to fill containers, especially packages of composite material (cardboard with a PE coating), rapidly with a liquid (e.g., juices).

To reduce the formation of foam by the liquid, the discharge element should generate a flow in the filling jet which is as completely laminar as possible. At the outlet of the metering device, therefore, the cylindrical body is arranged with fine, axially parallel passages. Almost no vortices form in the constricted space of the passages, so that the flow of liquid is almost completely calm or laminar. The diameter of the passages is determined in such a way that capillary force is exerted on the liquid in the passages. The passages open out into the flat valve seat. A filling valve with a cylindrical discharge element of this type is disclosed in, for example, EP 0 754 144 B1.

US 2012/0291898 discloses a filling valve in which, to reduce the formation of foam as the liquid is being dispensed, the closure element is brought into a first and a second open position, wherein, in the second open position, the area of the flow cross section between the valve seat and the closure element is larger than that in the first open position. The closure element comprises a first part and a second part, which can move independently of each other, wherein the part which comes first relative to the flow direction of the liquid through the metering device is surrounded by the second part, and the parts are arranged in such a way that the opening of the first part brings the closure element into the first open position, and the opening of the second part brings the closure element into the second open position.

It has been found in practice that fibers present in fruit juice-containing liquids can clog the passages of the discharge element. In particular, the fibers are deposited in the area bridging two adjacent passages.

It is proposed in EP 00 99 582 A2 that the distance between the inlets of the passages of the discharge element be minimized to prevent the buildup of fruit-juice fibers between the inlets.

WO 2010/097730 A1 discloses a filling valve for filling containers with fruit juices in particular, in the cylindrical valve chamber of which a conically shaped swirling device for the liquid is arranged. The conical shape reduces the probability that fruit pulp or fibers will clog the passages.

EP 0 278 560 A1 discloses a filling valve with a discharge element arranged at the outlet of the filling valve, which discharge element comprises axially parallel passages. The diameter of the passages is determined in such a way that fruit pulp and fibers will not clog the passages; the flow resistance is so high, however, that the liquid can be dispensed from the discharge element only by the application of pressure.

To prevent fruit pulp from clogging a jet divider arranged on a filling head for fruit juices, U.S. Pat. No. 4,574,853 B1 discloses a jet divider comprising a plurality of frustoconical parts arranged concentrically to each other a certain axial distance apart. An upper edge arranged on the parts diverts at least some of the liquid jet in a vertical direction.

BRIEF SUMMARY OF THE PRESENT INVENTION

Against the background of these prior arts, the object of the invention is to provide an improved filling valve discharge element, in which in particular the clogging of the passages of the discharge element by fibers is avoided.

This object is achieved in the case of a filling valve of the type described above in that the passages opening out into the surface of the discharge element are extended by tubes proceeding from the surface toward the closure element; in that the closure element comprises caps; and in that each tube can be closed by one of the caps, which surrounds the tube at least in the closed position to form an annular space.

The interior of each cap is preferably bounded by a base surface, a lateral surface, and a cap opening opposite the base surface. Each cap opening is surrounded by a circumferential edge.

In the closed position, each cap is either seated by its base surface on an upper inlet opening of the tube to form a seal, or it is seated by its circumferential edge on the surface of the discharge element. Liquid is present in the valve chamber above the valve seat. Opening the closure element has the effect of freeing the inlet openings of the tubes, so that the liquid flows through the annular space and into the inlet openings of the tubes. This flow effect in the annular space results in the effective removal of any fibers which may be present.

If the caps surround each tube both in the closed and in the open position of the closure element to form an annular space, a stronger flow and thus and even more effective removal of solids in the area of the inlet openings leading into the tubes is achieved.

In each cap, the base surface, the lateral surface, and the cap opening opposite the base surface preferably form the boundaries of a cylindrical chamber. If both the cylindrical chamber and tube surrounded by the cylindrical chamber comprise cross sections of the same shape, preferably a cylindrical cross section of constant radius, uniform flow conditions develop in the annular space when the closure element is opened. If a frustoconical chamber, which expands in the direction toward the valve seat, surrounds a tube with a constant-radius cylindrical cross section, the flow conditions change continuously when the closure element is opened.

Insofar as the filling valve comprises a closure element with an open position and closed position, it is advantageous for all of the caps to be connected to each other to form a structural unit. The structural unit can be produced, for example, by the use of struts to connect the caps or by combining the caps into a single component. The structural unit is fastened to the side of the closure element facing the valve seat. The caps can also be configured as an integral component of the closure element extending from the side of the closure element facing the valve seat.

Insofar as the filling valve comprises a two-part closure element comprising a first and a second open position and a closed position, the caps of each part are connected to each other in groups to form a structural unit. The structural units can be produced, for example, by the use of struts to connect the caps or by combining the caps of a group into a single component. One of the two structural units is fastened to the side of the first part of the closure element facing the valve seat, and the other of the two structural units is fastened to the side of the second part of the closure element facing the valve seat. The structure of a filling valve with a two-part closure element is known to the expert from, for example, US 2012/0291898, the content of which is expressly included in the disclosure of this application.

To improve the sealing effect, the caps preferably consist of an elastic material, especially plastic. Alternatively, the cap can consist of a rigid material such as metal, wherein a sealing surface of elastic material is arranged on each cap. If it is the base surface of the cap which, when in the closed position, seals the upper inlet opening of the tube, the sealing surface will be arranged on the base surface of the cap. If it is the edge of the cap extending around the circumference of the cap opening which seals the tube in cooperation with the surface of the valve discharge element, the sealing surface will preferably be provided on the surface of the circumferential edge.

To avoid the deposition of fibers on the valve seat, a preferably centrally arranged drain passage is preferably arranged in the discharge element, on which no tube is arranged. This passage is closed by a sealing element, which closes the drain passage when the caps are seated on the inlet openings of the tubes. When the caps arranged on the valve body are raised, the drain passage is opened as well.

BRIEF DESCRIPTION OF THE DRAWINGS

The invention is explained in greater detail below on the basis of the figures.

DETAILED DESCRIPTION OF THE PREFERRED EMBODIMENTS

Figure 1:
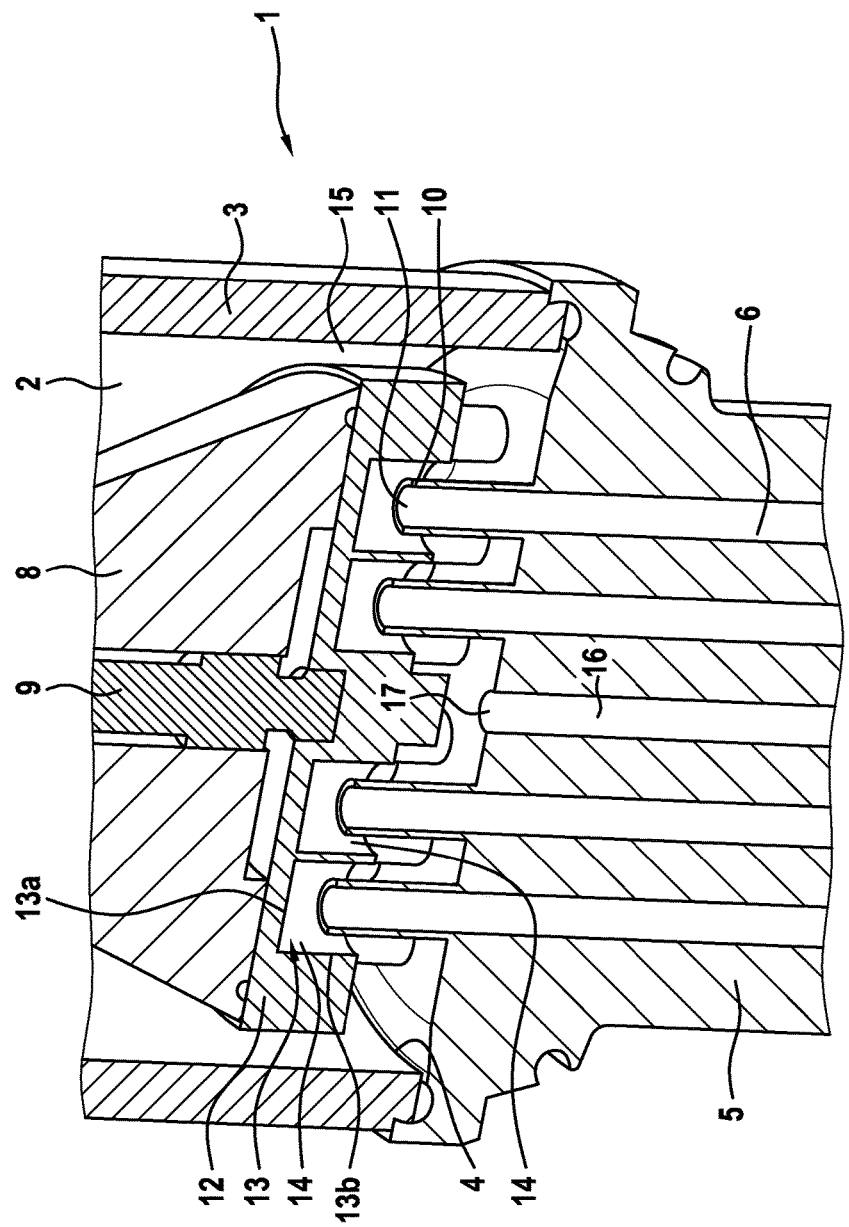
FIG. 1 shows a partial perspective view of a cross section of a filling valve according to an embodiment of the invention in an open position.

FIG. 1 shows a partial cross section through a filling valve 1 according to an embodiment of the invention for filling containers with fruit juice-containing liquid, especially juices. The filling valve 1 comprises a liquid feed (not shown in the partial diagram) for supplying the liquid to a valve chamber 2, which is bounded by a valve housing 3, and an outlet 4 located at the bottom of the valve housing 3. A cylindrical discharge element 5, which, in the exemplary embodiment, has a cylindrical shape of constant radius, is fastened to the bottom of the valve housing 3 at the outlet 4. When the filling valve 1 is operating, the valve chamber 2 is completely filled with liquid.

The cylindrical discharge element 5 comprises a plurality of passages 6, arranged next to each other and extending in the axial direction. The flat surface 5a of the discharge element 5 facing the valve chamber 2 is a component of the valve seat 7 of the filling valve 1.

A closure element 8, which can be moved back and forth by a drive, is arranged in the valve chamber 2, wherein the drive action is produced, for example, by a drive rod 9, which is guided out from the valve housing 3 through a seal.

The passages 6 opening out into the surface 5a are extended by tubes 10 proceeding from the surface 5a of the discharge element 5 in the direction toward the closure element 8. As a result, the inlet openings 11 for the liquid are shifted upward from the plane of the surface 5a of the discharge element 5 in the direction toward the closure element 8. Each passage 6 in the discharge element 5 is extended by a passage in the tube 10 aligned with it.

To the bottom surface of the closure element 8 a component 12 is fastened, which connects a plurality of caps 13 to each other to form a structural unit, wherein each tube 10 can be closed by one of the caps 13. The interior of each cap 13 is bounded by a base surface 13a, a lateral surface 13b, and a cap opening situated opposite the base surface 13a and parallel to it, a certain distance away.

Figure 2:
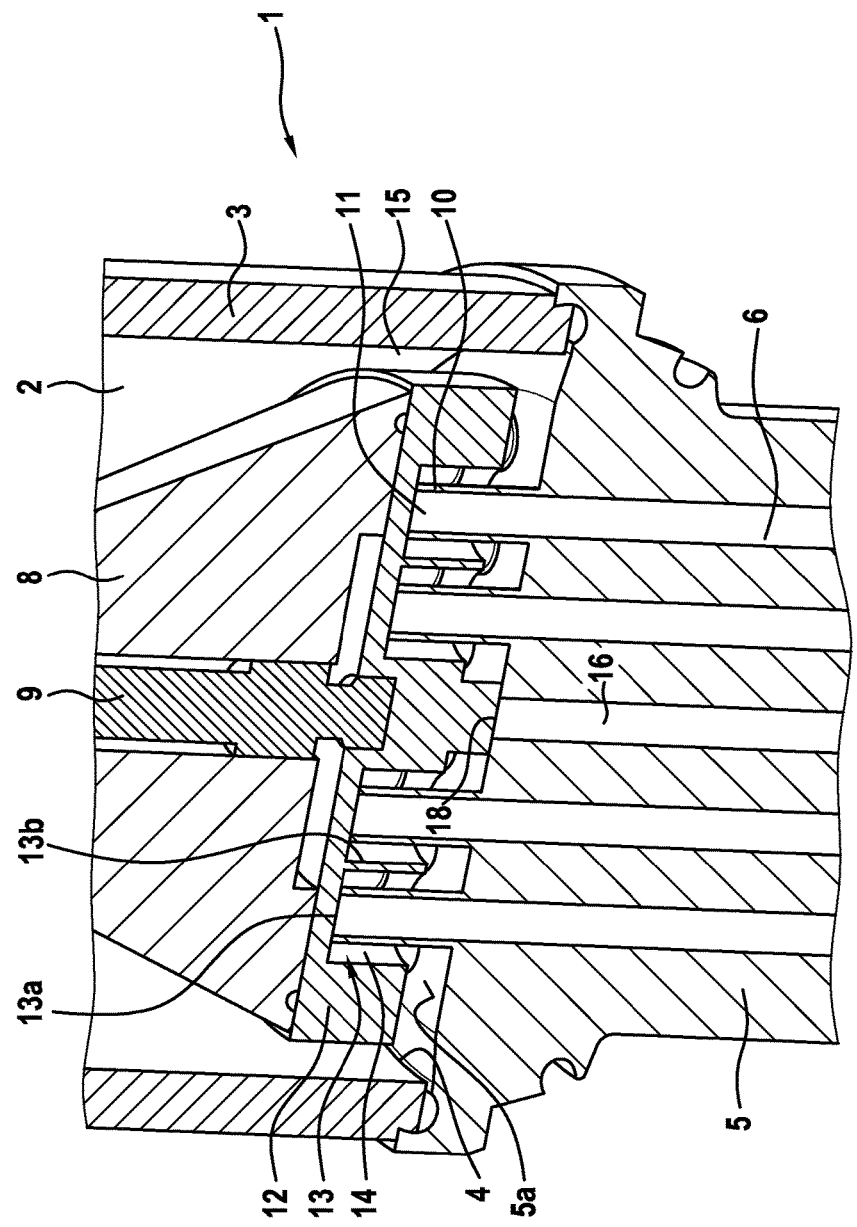
FIG. 2 shows the filling valve of FIG. 1 in a closed position.
Figure 3:
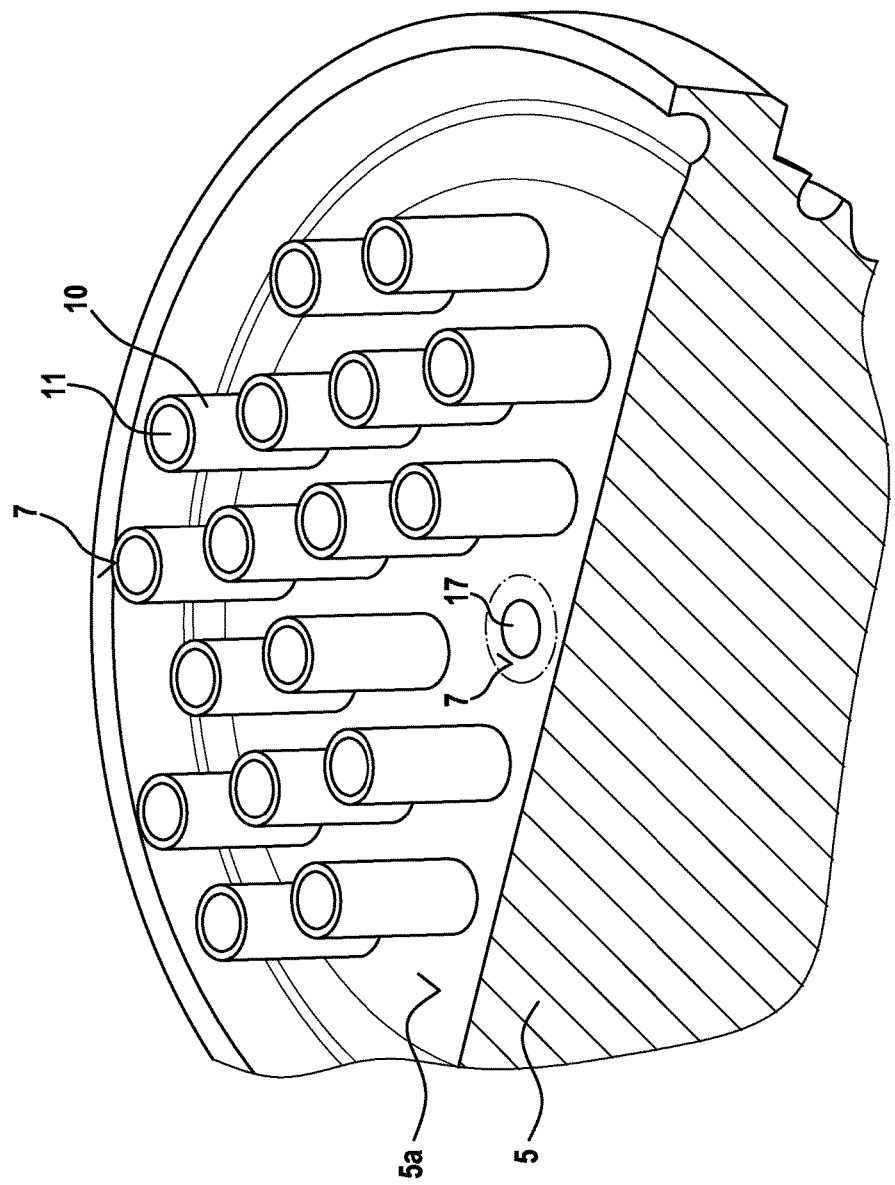
FIG. 3 shows a detailed perspective view of a valve seat of the filling valve of FIG. 1 in cross section.

The caps 13 surround their assigned tubes 10 both in the open position of the closure element 8 shown in FIG. 1 and in the closed position shown in FIG. 2 to form an annular space 14 between the outside wall of the tube 10 and the lateral surface 13b of the cap 13.

In the closed position shown in FIG. 2, all of the caps 13 are seated by their base surfaces 13a with a sealing action on the upper inlet openings 11 of the tubes 10. In the annular space 14 is liquid to be transferred, which is present in the valve chamber 2. The liquid passes through a gap 15 between the valve housing 3 and the outside lateral surface of the closure element 8 regardless of the position of the closure element 8 and thus always arrives in the area of the valve chamber 2 located between the surface 5a of the discharge element 5 and the bottom surface of the closure element 8.

Figure 7:
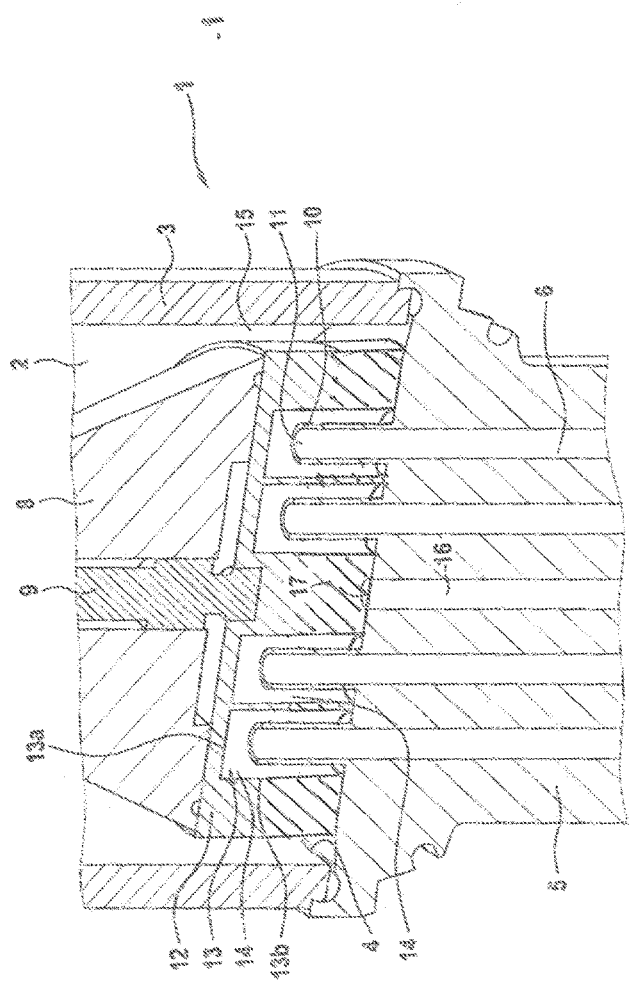
FIG. 7 shows an alternative embodiment of a filling valve in a closed position.

In a further embodiment shown in FIG. 7, an edge of the cap 13 extending around the circumference of the cap opening seals the tube 10 in cooperation with the surface 5a of the discharge element.

When the drive rod 9 now moves the closure element 8 from the closed position shown in FIG. 2 into the open position shown in FIG. 1, the base surfaces 13a of the caps 13 are lifted away from the inlet openings 11 of the tubes 10, and the liquid flows through the annular space 14 and across the inlet openings 11 of the tubes 10. As a result, fibers present in the area of the tubes 10 are effectively removed.

It is guaranteed that the liquid will flow through the annular space 14 and across the inlet openings 11 of the tubes 10 when the closure element 8 is lifted, because the upper edge of each tube 10 forming the boundary of the inlet opening 11 is always located below the liquid level in the valve chamber 2 during operation of the filling valve. According to the principle of communicating vessels, the liquid level in the annular space 14 rises and ultimately flows over the upper edge of the inlet openings 11.

To prevent fibers and/or other solids in the liquid from being deposited on the surface 5a of the discharge element 5, a drain passage 16 leading from the surface 5a of the discharge element 5 is located centrally in the valve seat 7 between the tubes 10. The orifice 17 of the passage 16 is closed by a sealing element 18, which, when the caps 13 are seated by their base surfaces on the inlet openings 11 of the tubes 10, closes the drain passage 16, as can be seen especially clearly in FIG. 2. The sealing element 18 is advantageously also configured as an integral part of the component 12, which is fastened to the bottom surface of the closure element 8. When the base surfaces of the caps 13 are lifted from the tubes 10, the mechanical coupling of the caps 13 and the sealing element results in the opening of the drain passage 16 also, as can be seen especially clearly in FIG. 1.

Figure 4:
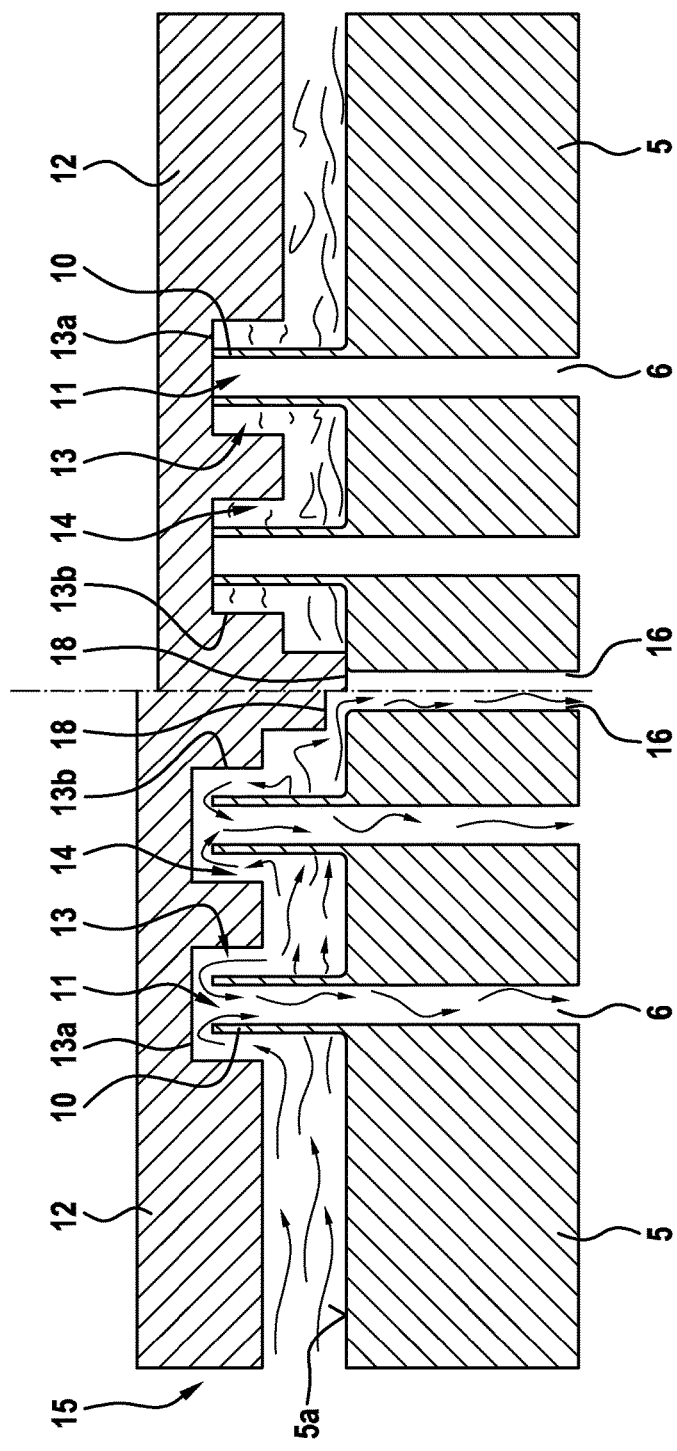
FIG. 4 shows a schematic diagram of the flow conditions at the valve seat of the filling valve in the open and closed positions.

FIG. 4 illustrates the flow conditions in the filling valve 1, where the caps 13 surround the tubes 10 to form the annular spaces 14 both in the open position shown schematically on the left in FIG. 4 and in the closed position of the closure element 8 shown schematically on the right in FIG. 4.

When the closure element 8 is opened, the liquid flows through the gap 15 and then laterally into the area between the surface 5a of the discharge element 5 and the bottom surface of the closure element 8. The continuing flow of liquid causes the liquid to rise in the annular spaces 14, and the liquid then flows across the upper edge of the tubes 10 and arrives via the inlet openings 11 in the passages 6.

Figure 5:
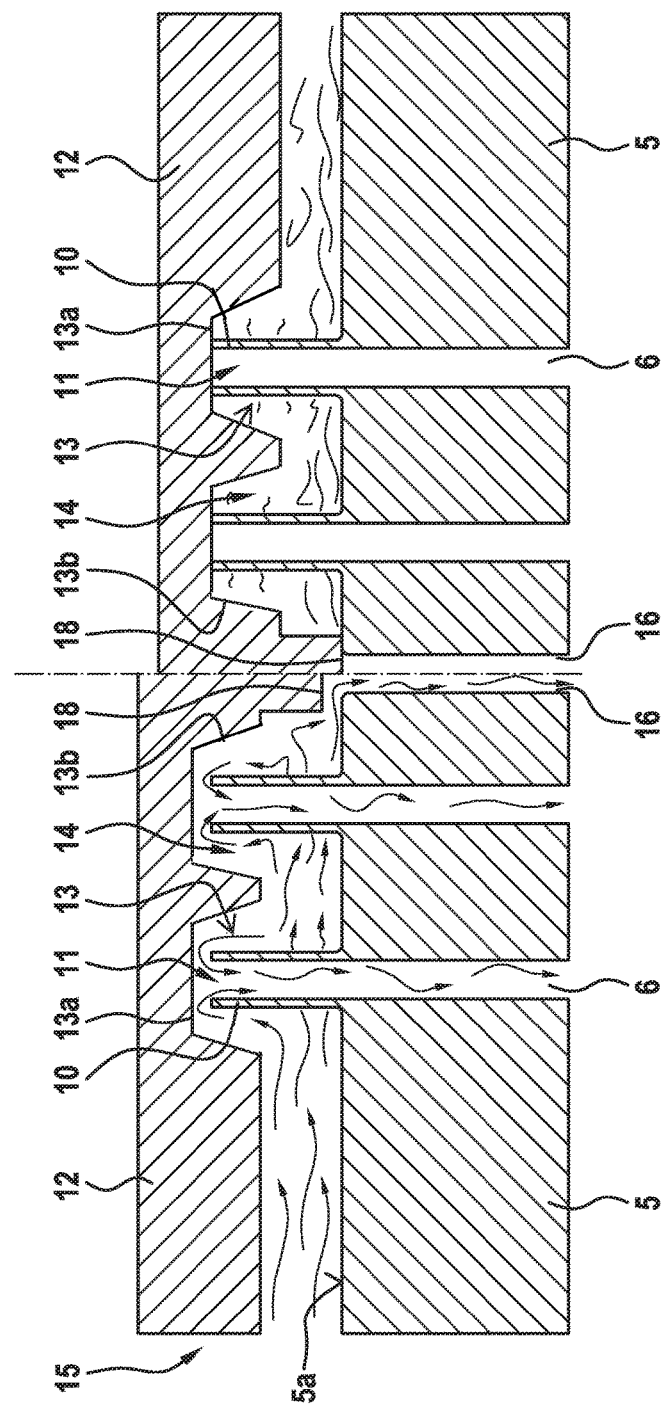
FIG. 5 is a schematic diagram as in FIG. 4 showing a further embodiment.

Instead of being cylindrical, the interior of the caps may be frustoconical as shown, for example in FIG. 5.

Figure 6A:
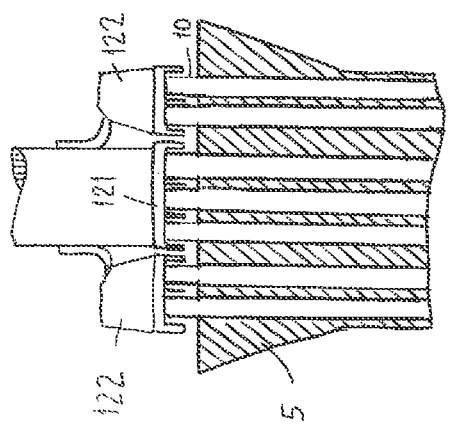
FIGS. 6A, 6B, and 6C show schematic diagrams of a further embodiment in a closed position, a first open position, and a second open position, respectively.
Figure 6B:
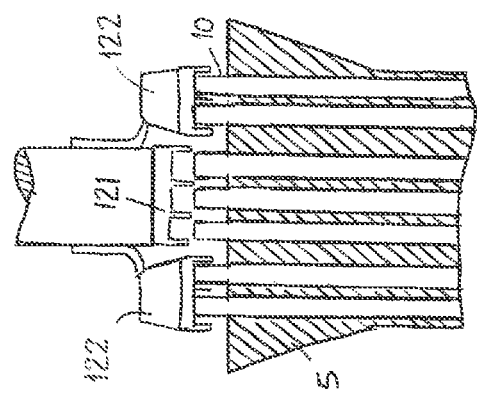
Figure 6C:
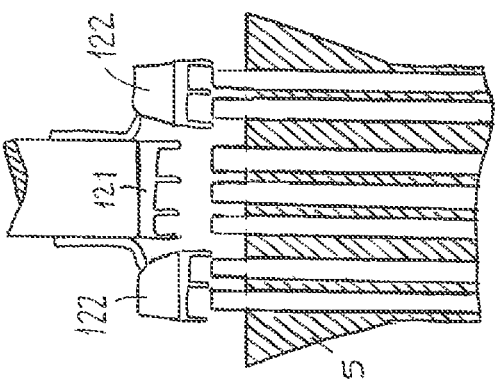

A further embodiment is shown in FIGS. 6A, 6B, 6C in which the component 12 includes a first part 121 and a second part 122. The first part 121 cover tubes in a center of the discharge element 5 and the second part 122 covers tubes surrounding the center of the discharge element 5. In a closed portion (FIG. 6A), all tubes are closed by the first part 121 and the second part 122. In a first open portion (FIG. 6B), the tubes covered by the first part are opened. In a second open portion (FIG. 6C), the tubes covered by the first part and the second part are opened. The connection and operation of the two parts 121, 122 are known, for example, from US 2012/0291898, the contents of which are incorporated herein by reference.

LIST OF REFERENCE NUMBERS

No. Designation
1 filling valve
2 valve chamber
3 valve housing
4 outlet
5 discharge element
5a surface
6 passages
7 valve seat
8 closure element
9 rod
10 tube
11 inlet opening
12 component
13 caps
13a base surface
13b lateral surface
14 annular space
15 gap
16 drain passage
17 orifice
18 sealing element

The invention claimed is:

1. A filling valve, comprising:
    a valve chamber defined by a valve housing for receiving liquid from a liquid feed and having an outlet;
    a valve seat;
    a closure element movable between an open position and a closed position, and interacting with the valve seat;
    a cylindrical discharge element arranged on the outlet of the valve chamber, the discharge element having a surface facing the closure element and forming a part of the valve seat, and a plurality of passages arranged adjacent to each other and extending parallel to each other in an axial direction, the passages being extended by tubes proceeding from the surface of the discharge element toward the closure element; and
    caps arranged on the closure element, wherein each of the tubes is closed by one of the caps when the closure element is in the closed position, and the one of the caps surrounds the each of the tubes at least in the closed position so that an annular space is formed between the one of the caps and the each of the tubes.

2. The filling valve according to claim 1, wherein the one of the caps surrounds the each of the tubes in both the closed position and the open position of the closure element to form the annular space.

3. The filling valve according to claim 1, wherein each of the caps has an interior bounded by a base surface, a lateral surface, and a cap opening opposite the base surface.

4. The filling valve according to claim 3, wherein a circumferential edge surrounds the cap opening.

5. The filling valve according to claim 3, wherein the interior of each of the caps is cylindrical.

6. The filling valve according to claim 3, wherein the interior of each of the caps is frustoconical, with the base surface being smaller than the cap opening.

7. The filling valve according to claim 1, wherein the closure element includes a structural unit connecting the caps to each other.

8. The filling valve according to claim 1, wherein the closure element comprises a first part and a second part which are movable independently of each other, the first part and the second part being arranged such that opening of the first part brings the closure element into a first open position of the closure element and opening of the second part brings the closure element into a second open position of the closure element,
    wherein a cross-sectional flow area between the valve seat and the closure element is larger in the second open position than in the first open position, and
    wherein the second part surrounds the first part.

9. The filling valve according to claim 8, wherein the structural unit includes a first structural unit and a second structural unit, the caps of the first part are connected by the first structural unit, and the caps of the second part are connected by the second structural unit.

10. The filling valve according to claim 1, wherein the caps consist of an elastic material.

11. The filling valve according to claim 1, wherein each of the caps includes a sealing surface closing a corresponding one of the tubes when the closure element is in the closed position, the sealing surface consisting of an elastic material.

12. The filling valve according to claim 11, wherein each of the caps has an interior bounded by a base surface, a lateral surface, and a cap opening opposite the base surface, the sealing surface being arranged on the base surface.

13. The filling valve according to claim 11, wherein each of the caps has an interior bounded by a base surface, a lateral surface, and a cap opening opposite the base surface, the sealing surface being arranged on a circumferential edge surrounding the cap opening.

14. The filling valve according to claim 1, wherein the caps are made of plastic.

15. The filling valve according to claim 1, wherein the cylindrical discharge element further comprises a drain passage arranged between the tubes which opens on the surface of the discharge element, and the closure element includes a sealing element that closes the drain passage when the closure element is in the closed position.

* * * * *